United States Patent [19]

Suizu

[11] Patent Number: 5,422,847
[45] Date of Patent: Jun. 6, 1995

[54] NON-VOLATILE MEMORY CONTROLLING APPARATUS

[75] Inventor: Katsuto Suizu, Saitama, Japan

[73] Assignee: Kabushiki Kaisha Toshiba, Kawasaki, Japan

[21] Appl. No.: 25,243

[22] Filed: Mar. 2, 1993

[30] Foreign Application Priority Data

Mar. 4, 1992 [JP] Japan .................................. 4-047002

[51] Int. Cl.6 .............................................. G06F 12/16
[52] U.S. Cl. ............................. 365/189.01; 365/230.01
[58] Field of Search .......................... 365/230.01, 189.01

[56] References Cited

U.S. PATENT DOCUMENTS 5,130,946  7/1992  Watanabe ..................... 365/189.01
5,265,048 11/1993  Kimura ........................ 365/230.01

FOREIGN PATENT DOCUMENTS 55-104118  8/1980  Japan .
58-111193  7/1983  Japan .
60-52769   4/1985  Japan .

Primary Examiner—Viet Q. Nguyen
Attorney, Agent, or Firm—Cushman, Darby & Cushman

[57] ABSTRACT

A non-volatile memory controlling apparatus wherein a controlled circuit can be controlled by using controlling data from a controller within a device and can be externally controlled by using controlling data from an external controller through an external terminal and the above mentioned various controlling data can be memorized in a non-volatile memory, characterized in that said non-volatile memory has an area which can switch a writing permission and writing inhibition and writing into said area of said non-volatile memory will be permitted when in the controlling mode from said external controller but will be inhibited when not in that mode.

10 Claims, 3 Drawing Sheets

NON-VOLATILE MEMORY CONTROLLING APPARATUS

BACKGROUND OF THE INVENTION

1. Field of the Invention

This invention relates to non-volatile memory controlling apparatus and more particularly to a non-volatile memory controlling apparatus wherein data contents will be able to be secured even in case a controller within an electric device fails or stampedes.

2. Description of the Related Art

FIG. 4 shows a block diagram of a conventional non-volatile memory controlling apparatus.

In FIG. 4, the reference numeral 1 represents a plug feeding a power source to an electric device. A power source line from the plug 1 is connected to a power source circuit 3 for a stand-by circuit through a power source switch 2. When the power source switch 2 is engaged, this power source circuit 3 will feed a power source voltage a and resetting signal b to a controller 4 and will feed the power source voltage a to a non-volatile memory 5 and input circuit 6. The non-volatile memory 5 has a function of continuing to memorize already memorized data contents even if the power source voltage a is not fed but will be able to write in and read out data when the power source voltage a is fed. The input circuit 6 has a power source key and various keys and detects various instructions from the user and outputs them as detecting signals. The controller 4 controls switching on/off a relay 7 on the basis of the detecting signal, for example, of switching the power source on/off from the input circuit 6. When the relay 7 is switched on, an electric power will be fed to a power source circuit 8 for feeding a power source to the electric device body, a power source voltage c will be fed to controlled circuits 9 and 10 and these circuits 9 and 10 will operate. There are various other controlled circuits than the two circuit represented by the reference numerals 9 and 10 so that various circuit operations may be made.

The non-volatile memory 5 and controlled circuits 9 and 10 are connected with the controller 4 within the device thorough a control bus line 11 so as to be controlled with controlling data from this controller 4. The control bus line 11 is connected to an external terminal 12 to which an external controller not illustrated can be connected. The non-volatile memory 5 and controlled circuits 9 and 10 on the control bus line 11 can be controlled by controlling data from the external controller.

The controller 4 is formed of a microcomputer. In case the electric device is, for example, a television receiver, the input circuit 6 will have a power source key, channel key, sound volume key and brightness adjusting key and the controller 4 will not only generate controlling data for switching the power source on/off but will also generate controlling data for the channel selection, sound volume and picture brightness on the basis of the instruction from the input circuit 6 and will control such circuits as the channel selecting circuit, sound volume circuit and video circuit as the controlled circuits 9 and 10. From the external controller connected to the external terminal 12, correction data of picture deformations and correction data For the adjustment of the white balance of the entire picture in the production line or the like of a factory are fed to such circuits as a picture deformation correcting circuit and white balance correcting circuit as the above mentioned controlled circuits 9 and 10 so that the picture deformation correction and white balance adjustment may be made.

As mentioned above, the controller 4 within the device deciphers the instruction from the input circuit 6 and feeds controlling data to such controlled circuit as a sound volume circuit to control the sound volume or the like. Also, the external controller feeds controlling data to such controlled circuit as a picture deformation correcting circuit to control the picture deformation correction or the like. The control bus line 11 is formed of a two-line type dual-direction serial bus. The control data consist of address data instructing respective controlled circuits and data (such as sound volume data and picture deformation correcting data) of control contents following them. The control data from the controller control the respective controlled circuits but, on the other hand, are memorized in the non-volatile memory 5.

In such formation, the controlled circuits 9 and 10 and non-volatile memory 5 can be controlled through the control bus line 11 by the controller 4 within the device or the controller outside the device connected to the external terminal 12.

For example, on the basis of the instruction from the input circuit 6, the controller 4 within the device feeds sound volume data to the sound volume circuit to control the sound volume circuit but, on the other hand, operates to memorize the sound volume data in the non-volatile memory 5. (This is to prevent that, if the sound volume data are memorized in the memory of the controller 4, when the power source is switched off, the controller 4 will be initialized and the data will vanish.) When the power source is switched off by the input circuit 6 and is then again engaged, the sound volume data stored in the non-volatile memory 5 will be read out and will be fed again to the sound volume circuit to reproduce the former state. By the way, even in case the plug side power source switch 2 is switched off while the power source is switched on in the input circuit 6 and the power source switch 2 is again engaged, the former state are memorized in the non-volatile memory 5 will be reproduced. If channel data for controlling the channel selecting circuit are memorized besides the sound volume data, the channel when the power source is off is memorized and when the power source is engaged again, the same channel will be able to be reproduced. In such case, the data memorized in the non-volatile memory 5 will be variable data renewed by each input operation of the user.

Now, in a television receiver, as a high voltage of about 30 KV is produced in a cathode ray tube, a so-called cathode ray tube discharge will be made and a noise of a high voltage will be generated. When the noise is generated, it will come into the controller 4 as a foreign noise and the controller 4 will stampede rarely. Static electricity will accumulate in the human body in winter or the like. When the switch of the television receiver is about to be pushed, static electricity will flow and the controller 4 will rarely stampede because of it. Because the controller 4 stampedes, an error will be generated in the controlling data on the control bus line 11 and the memorized data of the non-volatile memory 5 will be destroyed. When the data of the non-volatile memory 5 are thus destroyed, the sound volume will become very small or very large. However, if the user operates the input circuit 6 to make the sound volume large or small, this defect will be recovered, therefore, will not become a fatal failure and will leave no particular problem.

On the other hand, in the production line or the like of a factory producing electric devices, in the system formation of the devices, the half fixed value peculiar to each device from the external controller connected to the external terminal 12 are set (memorized) in the non-volatile memory 5 through the control bus line 11. More particularly, in order to write data into the non-volatile memory, the external controller by the microcomputer is connected to the external terminal 12 and the data are written into the non-volatile memory 5. For example, the data are written in by varying the adjusted amount on the production line of the factory. In such case, if this is made by the internal controller 4, the burden of the internal controller 4 will become large. Therefore, the computer is connected to the external terminal 12 and the data are fed into the external terminal 12, or the data are written into the non-volatile memory 5 by a writing means. These memory data are half fixed data determining the system of the device. When the device is operating singly or plurally, the half fixed data thus set in the non-volatile memory 5 will be transferred to the controlled circuits 9 and 10 so that the device performance expected by the producer may be obtained.

For example, in a television receiver, in order to correct a picture deformation (to correct a graphic deformation of the picture) or to adjust a white balance of the entire picture, the data are fed to the respective controlled circuits (that is, the picture deformation correcting circuit or white balance correcting circuit by using the external controller) to correct the picture deformation or adjust the white balance. In this case, in the factory, the data will be adjusted by such setting means as the above described variable resistance and will be memorized in the non-volatile memory 5. Thereby, in the ordinary operating state of the television receiver, when the user engages the power source to see and hear the television receiver, the memory data will be read out of the non-volatile memory 5 and will be fed to the respective controlled circuits (that is, the picture deformation correcting circuit and white balance correcting circuit) to automatically correct the picture deformation and adjust the white balance. In such case, in the adjusting step in the factory, even if the data are once destroyed, they may be input again and therefore the influence will be comparatively small but, in case the adjusting data are destroyed in the user's place due to the failure of the internal controller, the data will have to be input again in the factory. This is very problematical as an article.

As described above, there has been a problem that, when a foreign noise comes into the controller 4 within the device and the controller 4 fails or becomes uncontrollable (stampedes), there will be a possibility of destroying the data of the non-volatile memory 5, the half fixed data from outside adjusted in advance will be also destroyed besides the variable data and, in the worst case, the entire system will be destroyed.

SUMMARY OF THE INVENTION

An object of the present invention is to provide a non-volatile memory controlling apparatus wherein, even in case a controller within an electric device fails, the possibility of destroying the data of a non-volatile memory will be minimized and particularly the destruction of data influencing the system formation of the device will be able to be eliminated.

Another object of the present invention is to provide a non-volatile memory controlling apparatus wherein the reliability of the electric device can be elevated by eliminating the possibility of destroying data.

That is to say, the non-volatile memory controlling apparatus according to the first present invention comprises:

an electric device including a controlled circuit within it;

a first controlling means feeding controlling data to said controlled circuit in order to control said controlled circuit from outside said electric device;

a non-volatile memory which can memorize the controlling data at least from said first controlling means;

a writing controlling means which will be enabled to write said controlling data into said non-volatile memory when said first controlling means is controlling said controlled circuit but will be inhibited from writing in when said first controlling means is not controlling said controlled circuit; and a second controlling means provided within said electric device, reading out the controlling data memorized in said non-volatile memory and controlling said controlled circuit in accordance with the read data.

And, the non-volatile memory controlling apparatus according to the second present invention comprises: an electric device including a controlled circuit within it;

a first controlling means feeding first controlling data to said controlled circuit in order to control said controlled circuit from outside said electric device;

a second controlling means provided within said electric device and feeding second controlling data to said controlled circuit in order to control said controlled circuit;

a non-volatile memory which can memorize the first and second controlling data from said first and second controlling means;

a writing controlling means which control writing said first controlling data into said non-volatile memory and will be enabled to write said first controlling data into said non-volatile memory only when said first controlling means is controlling said controlled circuit; and a means reading out the controlling data memorized in said non-volatile memory under the control of said second controlling means and controlling said controlled circuit according to the read data.

According to the above mentioned formation, in case such half fixed data as determine the system of an electric device are set for the non-volatile memory from the outside controller, the non-volatile memory will be permitted of writing in data, therefore the above mentioned half fixed data will be set, in case the electric device is in the ordinary operating state, the non-volatile memory will be inhibited from writing in data and therefore, even in case the controller within the device fails or stampedes, the contents of the half fixed data within the non-volatile memory will be secured without being varied.

DETAILED DESCRIPTION OF THE PREFERRED EMBODIMENTS

Figure 1:
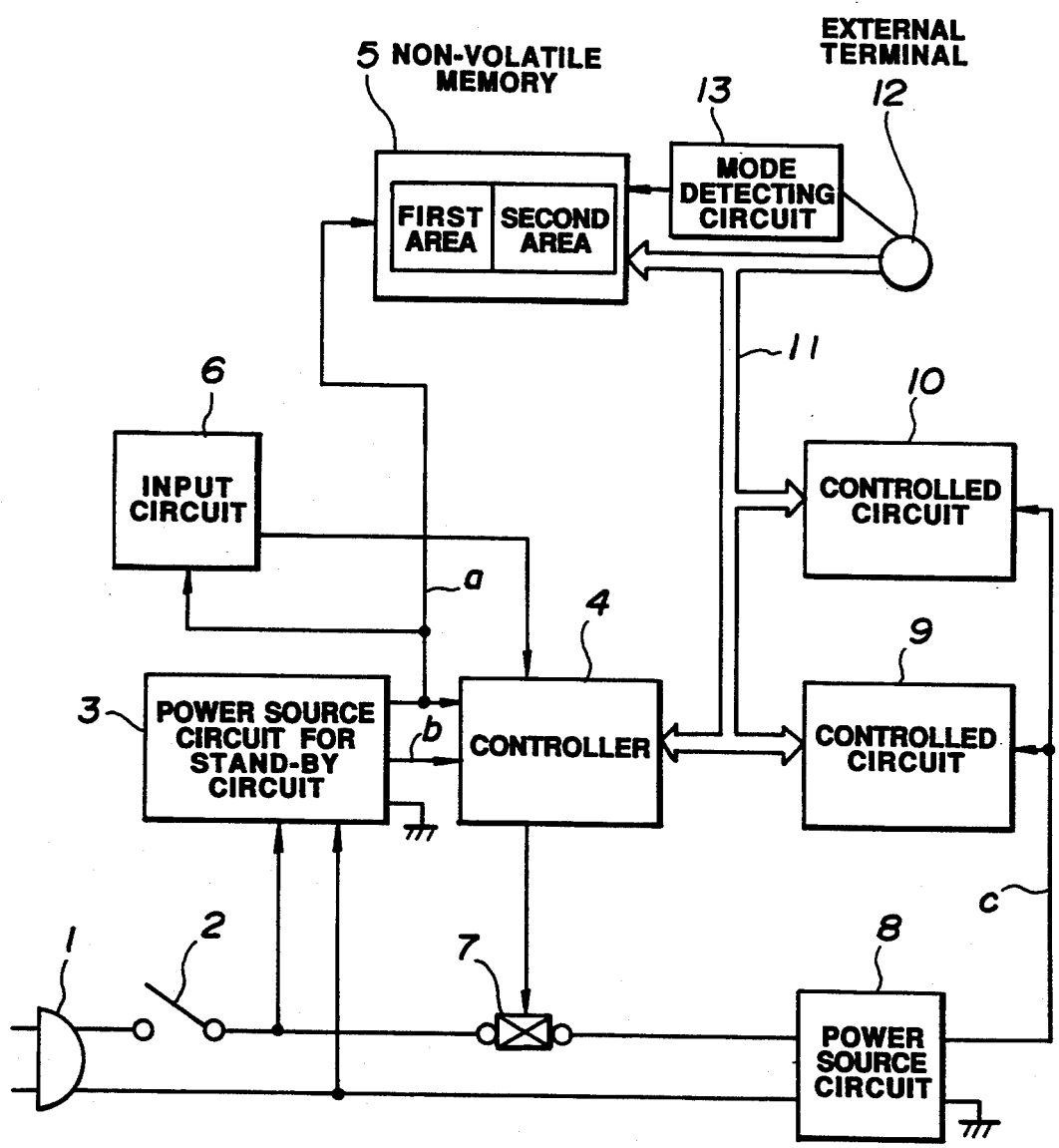
FIG. 1 is a block diagram showing a non-volatile memory controlling apparatus relating to an embodiment of the present invention.

FIG. 1 is a block diagram showing a non-volatile memory controlling apparatus relating to an embodiment of the present invention.

Figure 4:
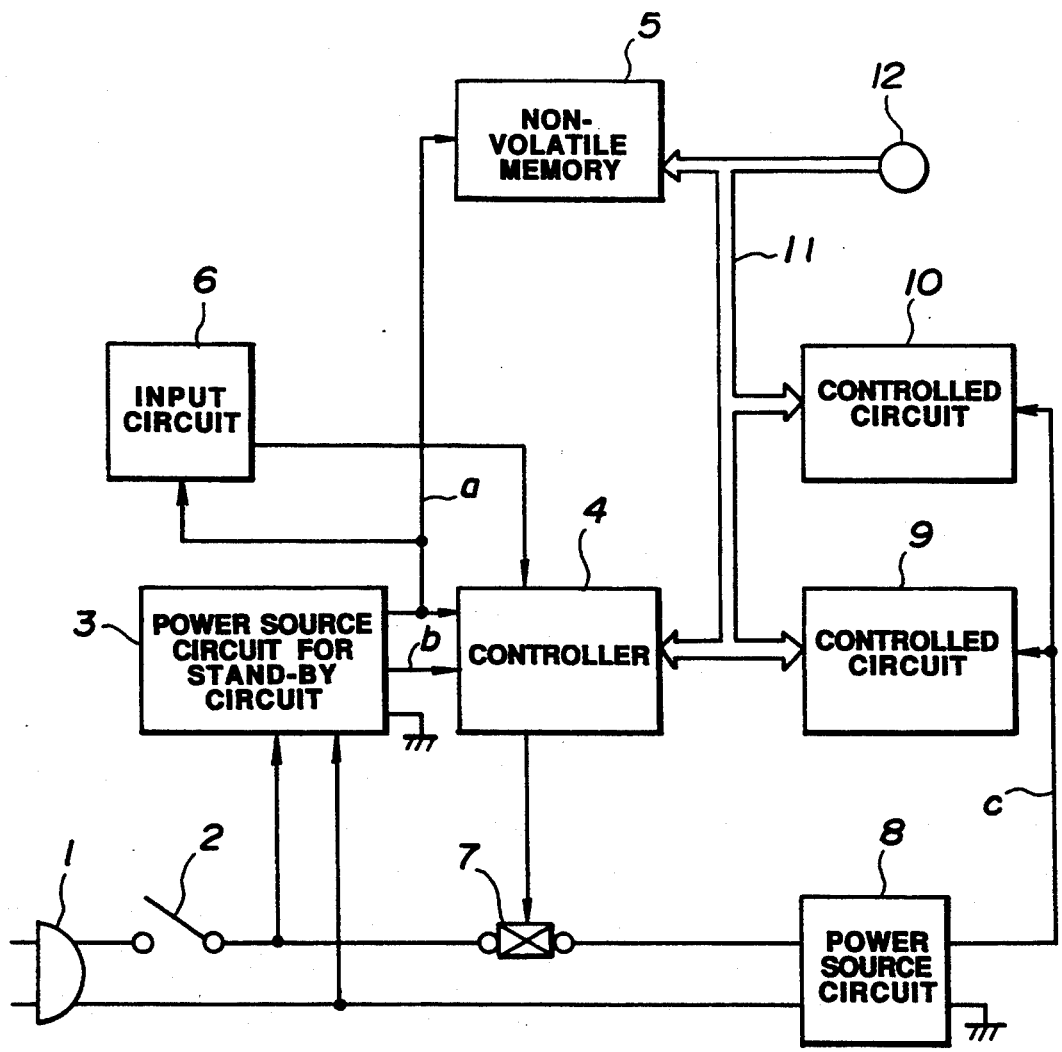
FIG. 4 is a block diagram showing a conventional non-volatile memory controlling apparatus.

In FIG. 1, the same parts as in FIG. 4 shall be explained with the same reference numerals. The reference numeral 1 represents a plug for feeding a power source to an electric device. A power source line from the plug 1 is connected to a power source circuit 3 for a stand-by circuit through a power source switch 2. While the power source switch 2 is engaged, this power source circuit 3 will feed a power source voltage a and resetting signal b to a controller 4 and will feed the power source voltage a to a non-volatile memory 5 and input circuit 6. The non-volatile memory 5 has a function of continuing to memorize the already memorized data contents even if the power source voltage a is not fed but, when the voltage source voltage a is fed, the non-volatile memory 5 will be able to write in and read out data. The input circuit 6 has a power source key and various keys, detects various instructions from the user and outputs them as detecting signals. The controller 4 controls a relay 7 to be on/off on the basis of a detecting signal, for example, switching on/off the power source. When the relay 7 is switched on, an electric power will be fed to a power source circuit 8 for feeding a power source to the electric device body and a power source voltage c will be fed to controlled circuits 9 and 10 to operate them. There are various other controlled circuits than the two circuits represented by the reference numerals 9 and 10 so that various circuit operations may be made.

The non-volatile memory 5 and controlled circuits 9 and 10 are connected with the controller 4 within the device through a control bus line 11 so as to be controlled by the controlling data from this controller 4. The control bus line 11 is connected to an external terminal 12 to which can be connected an external controller not illustrated. The non-volatile memory 5 and controlled circuits 9 and 10 on the control bus line 11 can be controlled by the controlling data from the above mentioned external controller.

This embodiment is characterized in that the non-volatile memory 5 is divided into a first area into which the controlling data from the controller 4 within the device can be written the same as before and a second area in which a permission and inhibition of writing in the controlling data from the external controller outside the device can be switched and a mode detecting circuit 13 feeding a controlling signal of permitting or inhibiting writing data into the writing controlling terminal of the non-volatile memory 5 in response to the presence or absence of the controlling data from the external controller connected to the external terminal 12 is provided between the external terminal 12 and non-volatile memory 5. This mode detecting circuit 13 detects whether or not the external controller (not illustrated) connected to the external terminal 12 externally controls the controlled circuits 9 and 10 through the control bus line 11 and will permit the second area of the non-volatile memory 5 of writing in data by the above mentioned writing permitting controlling signal when there are externally controlling data from the external terminal 12 but will inhibit the second area of the non-volatile memory 5 from writing in data by the above mentioned writing inhibiting controlling signal when there are no externally controlling data from the external terminal 12.

In such formation, in the externally controlling state through the control bus line 11 from the external terminal 12, the above mentioned second area of the non-volatile memory 5 will be enabled to write in data by the writing permitting controlling signal from the mode detecting circuit 13 but, when the externally controlling state from the external terminal 12 is not made, the mode detecting circuit 13 will generate a writing inhibiting controlling signal and will inhibit the above mentioned second area of the non-volatile memory 5 from writing in data. Therefore, in ease such data as determine the system of the electric device are set, when the external terminal 12 is externally controlled, half fixed data will be able to be set in the second area of the non-volatile memory 5 from the external controller. In the ordinary operation (operated with the controller 4 within the device) of an electric device not externally controlled, the second area will be inhibited from writing in data and the above mentioned half fixed data will be only able to be read out but, on the other hand, the controlling data from the controller within the device will be able to be written into or read out of the first area. Therefore, in the ordinary operating state, even in ease the controller 4 fails or stampedes, the contents (values) of the half fixed data stored within the second area will not vary and will be secured and there will be no fear of leading the entire system to a destruction.

Now, the operation of FIG. 1 shall be concretely explained on the case that the electric device is a television receiver.

In case the power source switch 2 is on, on the basis, for example, of the sound volume instruction from the input circuit 6, the controller 4 within the device will feed sound volume data to the sound volume circuit as a controlled circuit, will control the sound volume circuit and, on the other hand, will operate to memorize the sound volume data in the first area of the non-volatile memory 5. After the power source is switched off by the power source key of the input circuit 6, when the power source is engaged again, the controller 4 will read out the data stored in the first area of the non-volatile memory 5, will feed the data again to the sound volume circuit to control it and will reproduce the sound volume state before the power source is off. By the way, while the power source is switched on by the power source key of the input circuit 6, in case the plug side power source switch 2 is switched off and is again engaged, the former sound volume state memorized in the first area of the non-volatile memory 5 will be reproduced. The controller 4 also memorizes the selecting channel in the first area of the non-volatile memory 5. When the power source is switched off and is then again engaged, the controller 4 will read out the selecting channel from the first area of the non-volatile memory 5 and will feed it to the selecting circuit as a controlled circuit and will control to select the same channel as when the power source is off.

On the other hand, in the factory, in case, by connecting the external controller to the external terminal 12, controlling data are fed to the respective controlled circuits (the picture deformation correcting circuit and white balance correcting circuit) to correct the picture deformation and to adjust the white balance, the external controller will feed the data adjusted by such setting means as a variable resistance to the controlled circuit to control it and will memorize the data in the second area of the non-volatile memory 5. Thereby, in the ordinary operating state of the television receiver, when the user engages the power source to see and hear the television receiver, the controller 4 within the receiver will read the memorized data out of the second area of the non-volatile memory 5 and will feed the data to the respective controlled circuits (the picture deformation correcting circuit and white balance correcting circuit) so that the picture deformation correction and white balance adjustment may be automatically made.

In this case, even if the controller 4 within the receiver fails or stampedes due to a foreign noise or the like, as the second area of the non-volatile memory 5 is inhibited from writing in data by the operation of the mode detecting circuit 13 in the ordinary operating state, the contents (values) of the half fixed data stored within the second area will be secured without being varied and the reliability of the receiver as an article will be able to be improved.

By the way, as another embodiment of the present invention, depending on the use, the non-volatile memory 5 may be so formed that the entire area may be the above mentioned second area. That is to say, in the formation wherein the channel selecting data and sound volume data when the power source is off are not memorized, the above mentioned first area will be unnecessary and therefore the non-volatile memory 5 will be able to be formed of only the second area.

Figure 2:
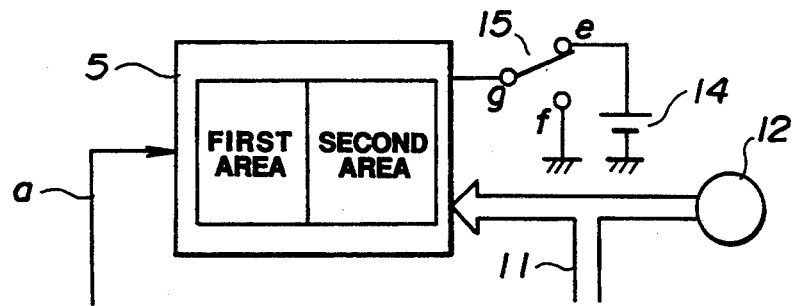
FIG. 2 is a block diagram showing another embodiment of the non-volatile memory controlling method.

FIG. 2 is a block diagram showing another embodiment of the writing control of the non-volatile memory 5.

In the embodiment shown in FIG. 2, the controlling signal of permitting or inhibiting writing to be fed to the writing controlling terminal of the non-volatile memory 5 is generated by switching on/off the voltage from such direct current power source 14 as a battery by using a manual switch 15. The switch 15 has two input ends e and f, one input end e is connected to a reference potential point through the direct current power source 14, the other input end f is connected to the reference potential point and an output end g is connected to the writing controlling terminal of the non-volatile memory 5. The other formations are the same as in FIG. 1 and shall not be explained here.

In such formation, when the switch 15 is switched to the input end e, the second area of the non-volatile memory 5 will be able to be permitted of writing. When the switch 15 is switched to the input end f, the second area of the non-volatile memory 5 will be able to be inhibited from writing. Therefore, while the external controller is connected to the external terminal 12, if the switch 15 is switched, the writing permission or inhibition of the second area will be able to be controlled manually.

By the way, as another embodiment of the present invention, the mode detecting circuit 13 detects whether the external controller is connected to the external terminal 12 or not, if the external controller is connected to the external terminal 12, the mode detecting circuit 13 will generate a writing permitting controlling signal and will control the second area of the non-volatile memory 5 to permit of writing and, if the external controller is not connected to the external terminal 12, the mode detecting circuit 13 will generate a writing inhibiting controlling signal and will control the second area of the non-volatile memory 5 to inhibit from writing.

Figure 3:
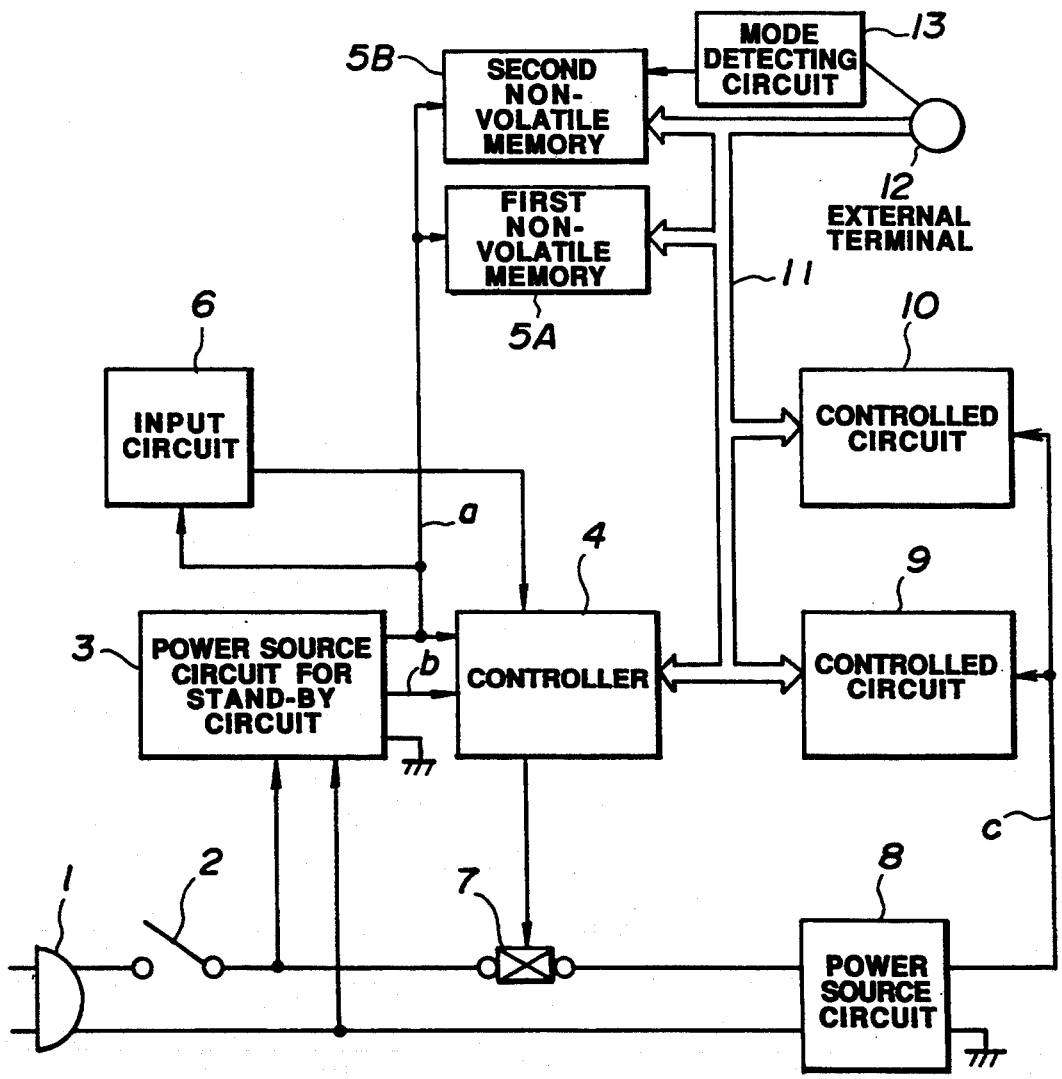
FIG. 3 is a block diagram showing a non-volatile memory controlling apparatus of another embodiment of the present invention.

FIG. 3 shows a block diagram of a non-volatile memory controlling apparatus of another embodiment of the present invention.

In the embodiment in FIG. 1, the first area and second area are formed within the non-volatile memory 5. However, in the present embodiment, a plurality of non-volatile memories are arranged on the control bus line 11 and the first and second areas are shared respectively by separate non-volatile memories 5A and 5B. The first non-volatile memory 5A corresponds to the first area and the second non-volatile memory 5B corresponds to the second area. Therefore, the second non-volatile memory 5B is a memory in which only the controlling data from the external controller are to be written and the first non-volatile memory 5A is a memory in which only the data from the controller 4 within the device are to be written. The controlling data are written into these non-volatile memories 5A and 5B by using address data corresponding to the respective memories.

As described above, according to the present invention, the function of protecting the data in the non-volatile memory will improve, the entire system formation controlled by the data will be able to be protected and a system higher in the safety and reliability will be able to be provided.

By the way, the present invention is not limited to the above mentioned embodiments but various modifications can be made in the range not deviating from the subject matter of the invention.

What is claimed is:

1. A non-volatile memory controlling apparatus comprising:
    a non-volatile memory for storing actual control data;
    an electric device including:
        a controlled circuit; and
        control means for reading the actual control data from the non-volatile memory and for controlling the controlled circuit in accordance with the actual control data;
    external control means for supplying the actual control data to the non-volatile memory and for controlling the controlled circuit from outside the electric device; and
    writing control means for allowing the non-volatile memory to store the actual control data when the external control means is controlling the controlled circuit, and for preventing the non-volatile memory from storing data, which is not the actual control data, when the external control means is not controlling the controlled circuit.

2. A non-volatile memory controlling apparatus according to claim 1, wherein the writing control means includes means for detecting the actual control data, so that the actual control data can be stored in the non-volatile memory when detected and so that data, which is not the actual control data, can be prevented from being stored in the non-volatile memory.

3. A non-volatile memory controlling apparatus according to claim 1, wherein the non-volatile memory includes a writing control terminal and the writing control means includes:

a direct current power source for supplying a first state voltage and a second state voltage to the control terminal; and means for switching the direct current power source to supply the first state voltage when the external control means is controlling the controlled circuit, thereby enabling the actual control data to be stored in the non-volatile memory, and for switching the direct current power source to supply the second state voltage when the control means is controlling the control circuit, thereby preventing data, which is not the actual control data, from being stored in the non-volatile memory.

4. A non-volatile memory controlling apparatus according to claim 2, wherein the detecting means detects if the external control means is connected to the electric device, enables the actual control data to be written to the non-volatile memory when the connection of the external control means to the electric device is detected, and prevents the data, which is not the actual control data, from being written to the non-volatile memory when the connection of the external control means to the electric device is not detected.

5. A non-volatile memory controlling apparatus comprising:
   a non-volatile memory for storing first and second actual control data;
   an electric device including:
      a controlled circuit;
      means for reading one of the first and second actual control data from the non-volatile memory; and
      control means for supplying the first actual control data to the non-volatile memory and for controlling the controlled circuit in accordance with the one of the first and second actual control data read by the reading means;
   external control means for supplying the second actual control data to the non-volatile memory and for controlling the controlled circuit from outside the electric device in accordance with the second actual control data; and
   writing control means for allowing the non-volatile memory to store the second actual control data only when the external control means is controlling the controlled circuit.

6. A non-volatile memory controlling apparatus according to claim 5, wherein:
   the non-volatile memory has a first memory region and a second memory region; and
   the writing control means causes the second actual control data to be stored in the second memory region when the external control means is controlling the controlled circuit, and causes the first actual control data to be stored in the first memory region when the external control means is not controlling the controlled circuit.

7. A non-volatile memory controlling apparatus according to claim 5, wherein:
   the non-volatile memory has a first non-volatile memory and a second non-volatile memory; and
   the writing control means causes the second actual control data to be stored in the second non-volatile memory when the external control means is controlling the controlled circuit, and causes the first actual control data to be stored in the first non-volatile memory when the external control means is not controlling the controlled circuit.

8. A non-volatile memory controlling apparatus according to claim 5, wherein the writing control means includes means for detecting the second actual control data supplied by the external control means, so that the second actual control data supplied by the external control means can be stored in the non-volatile memory only when detected, thereby preventing data, which is not the second actual control, from being stored in the non-volatile memory.

9. A non-volatile memory controlling apparatus according to claim 5, wherein the non-volatile memory includes a writing control terminal and the writing control means includes:
   a direct current power source for supplying a first state voltage and a second state voltage to the control terminal; and
   means for switching the direct current power source to supply the first state voltage when the external control means is controlling the controlled circuit, thereby enabling the second actual control data to be stored in the non-volatile memory, and for switching the direct current power source to supply the second state voltage when the control means is controlling the control circuit, thereby preventing data, which is not the second actual control data, from being stored in the non-volatile memory.

10. A non-volatile memory controlling apparatus according to claim 8, wherein the detecting means detects if the external control means is connected to the electric device, enables the second actual control data to be written to the non-volatile memory when the connection of the external control means to the electric device is detected, and prevents data, which is not the second actual control data, from being written to the non-volatile memory when the connection of the external control means to the electric device is not detected.

* * * * *